Patented May 22, 1951

2,554,424

UNITED STATES PATENT OFFICE 2,554,424

UREA-ALDEHYDE REACTION PRODUCTS AND PROCESS OF PREPARING SAME

Tzeng-Jiueq Suen, Old Greenwich, Conn., assignor to American Cyanamid Company, New York, N. Y., a corporation of Maine No Drawing. Application March 5, 1947, Serial No. 732,645

5 Claims. (Cl. 260—69)

This invention relates to urea-aldehyde resins and the process of preparing same. More particularly, the invention is directed to unmodified urea-formaldehyde resins which are cold-setting, and processes of preparing these new resins.

Thermosetting urea-aldehyde resins are old and well-known in the art. Many processes have been devised for their production, and many utilities have been made of their properties. They have been particularly advantageously employed in the arts of surface finishing, adhesives, molding compositions, wet strength paper, and as ion exchange resins in the purification of liquid media. It has heretofore been believed that an inherent property of the urea-formaldehyde condensation products, is that upon the continued application of heat, infusible and insoluble products were obtained.

It has now been found as herein described more fully, that according to the teachings of this invention, a series of unmodified urea-formaldehyde resins may be prepared, which, when correlated with respect to pH and temperature, will remain liquid indefinitely, and, upon lowering of temperature, will experience an increase is viscosity to the point of infusibility and insolubility. It has further been ascertained, according to the teachings of the invention, more fully described herein below, that by correlation of pH and temperature, the rate of increase of viscosity may be controlled such that products of any desired viscosity may be obtained, and if the viscosity is increased beyond a desired point, the process is reversible to decrease viscosity to the desired point. A further embodiment of the invention is the fact that when a desired viscosity has been obtained, the resulting syrup may be neutralized to prevent further change in the viscosity, and by proper drying at comparatively low temperature, such as spray drying, a dry powder of the degree of polymerization comparable to that of the syrup viscosity is obtained, which is redispersible or dissolvable in water or water-alcohol solutions to obtain a product of the desired viscosity, which, in turn, may be increased or decreased in viscosity, according to the proper manipulation of temperature and pH.

The foregoing and other embodiments, objects and advantages of this invention are attained by effecting reaction between urea and formaldehyde at elevated temperatures, first under alkaline conditions and then adjusting pH conditions such that viscosity does not increase, and thereafter aging the resin by decreasing the temperature to effect viscosity increase, the rate of which may be controlled by the proper adjustment of the pH and temperature.

Although the mechanism of the reaction has not yet been completely understood, it appears that two reversible reactions proceed simultaneously in the systems under consideration. For the sake of convenience, these two reactions are called "polymerization" and "depolymerization." At higher temperatures and proper pH conditions, the rate of depolymerization exceeds the rate of polymerization. Therefore, there is no viscosity increase, no matter how long the reaction mixture is heated. By lowering the system to below a critical temperature, the rate of polymerization becomes greater than the rate of depolymerization, and the viscosity begins to increase. Furthermore, both the rate of polymerization and the rate of depolymerization depend on pH value. Consequently, pH, in conjunction with temperature, can be adjusted to control the rate of viscosity increase.

It is believed that the invention will be more fully understood from the description of the following examples which are given by way of illustration, and not in limitation.

Example 1

One hundred twenty grams of urea, 405 grams of a 37% aqueous formaldehyde solution and 0.8 ml. of a 10% sodium hydroxide solution, were charged to a suitable vessel, and mixed by mechanical agitation to provide a mixture having a pH of 8.3. This mixture was heated to 70°–80° C., and after approximately ½ hour at this temperature, 3 ml. of a 10% solution of hydrochloric acid was added, resulting in an exothermic reaction which raised the temperature rapidly to a temperature of 90° C. A pH determination of the solution was made, and found to be 1.7. The reaction mixture was kept at a temperature of 90°–95° C. for approximately 1 hour, and then it was cooled to 40°–45° C., resulting in an increasing viscosity. It was neutralized with sodium hydroxide to yield a resinous syrup having a viscosity of G (Gardner-Holdt). Part of this syrup was spray dried at 200° C. to yield a dry powder that was water-alcohol soluble. The syrup, upon reacidification to a pH of approximately 2.5, and at least below 4, and heating to a temperature of approximately 70° C. or higher, a less viscous syrup was obtained, which did not increase in viscosity until cooled, and, upon cooling without neutralization, the viscosity increased rather rapidly; whereas, by raising the pH to approximately 2.5 to 3.5, and reducing the temperatures to below 70° C. and preferably between 50°–55° C., the viscosity of the syrup increased slowly. If permitted to increase sufficiently, the syrup gelled, and upon further setting, formed an insoluble, infusible product. The acidified syrup was also applied to wood panel, by brushing and also by dipping. When cooled, hard surface finishes resulted, which finishes could be coated again after about 20 minutes. Wood panels were coated with the acidified syrup and clamped together; after cooling 20 minutes, a firm bond resulted.

*Example 2*

Sixty parts of urea, and 203 parts of a 37% aqueous solution of formaldehyde were charged to a suitable vessel, and adjusted in pH to approximately 9 with 10% sodium hydroxide. The mixture was heated to a temperature between 70°–80° C., and held at that temperature for approximately ½ hour. The pH of the reaction mixture was then adjusted to 2.5 by the addition of concentrated hydrochloric acid. The acidified mixture was then heated to reflux and held for approximately 2 hours and 45 minutes, with no increase in viscosity. Upon cooling the reaction mixture to 55° C., the viscosity increased rapidly. Samples taken and neutralized at increments of approximately five minutes while at this temperature, possessed increasingly higher viscosities.

*Example 3*

Sixty parts of urea and 203 parts of a 37% aqueous formaldehyde solution were charged to a suitable reaction vessel, and adjusted with sodium hydroxide to a pH of 9.5. This mixture was heated to reflux and then cooled to approximately 70° C., and adjusted in pH to approximately 2.3 with a 10% sulfuric acid solution. After approximately 40 minutes at reflux, the temperature was reduced to 45–55° C. Samples taken at intervals and neutralized to a pH of 6.8–7 with sodium hydroxide, possessed viscosities of increasing degree in accordance with the period of time the sample was held at the lower temperature.

*Example 4*

Sixty parts of urea and 178 parts of a 37% aqueous solution of formaldehyde were charged to a suitable reaction vessel and mixed. The pH of the solution was adjusted with sodium hydroxide to approximately 9.2, and heated to 70° C., at which temperature it was held for approximately ½ hour, and then slowly adjusted in pH to 3.2 by slowly adding glacial acetic acid. The mixture was then refluxed for 15 minutes. The temperature was lowered to 40°–50° C., with a resulting slow increase in viscosity. Samples taken at intervals and neutralized, demonstrated an increasing viscosity.

*Example 5*

Sixty parts of urea and 203 parts of a 37% aqueous solution of formaldehyde were adjusted with sodium hydroxide to a pH of 9, and heated to 80° C. After approximately ½ hour at this temperature, the reaction mixture was adjusted to a pH of 2.4 with a 10% solution of phosphoric acid, and refluxed for 20 minutes. Upon cooling to approximately 50° C., and holding at that temperature, the resinous syrup increased in viscosity, and upon reheating, the viscosity decreased.

*Example 6*

Sixty parts of urea and 178.2 parts of a 37% aqueous formaldehyde solution were charged to a suitable reaction vessel and adjusted in pH to 9.4 with sodium hydroxide. It was heated to 70°–80° C., and held for 30 minutes, after which it was adjusted in pH to 2.3 with hydrochloric acid, heated to reflux, and held at reflux for approximately 1 hour. It was neutralized with sodium hydroxide to pH of 7.2 while hot. The resulting resinous syrup had a viscosity of C (Gardner-Holdt). When allowed to cool under partial neutralization, a slowly increasing viscosity was obtained, which, when permitted to continue, resulted in an infusible, insoluble product.

*Example 7*

One hundred and twenty (120) grams of urea and 405 grams of a 37% aqueous formaldehyde were mixed and the pH of the solution was adjusted to 8.3 with 10% sodium hydroxide. The mixture was heated to 70°–80° C., and maintained at this temperature for 30 minutes. Then the pH of the mixture was lowered to 2.0 by adding 2 ml. of 10% hydrochloric acid, and it was cooled immediately to approximately 55° C. The viscosity increased rapidly. After 5 minutes the resin attained a viscosity at 25° C. of J (Gardner-Holdt). After another 5 minutes, the resin formed a gel.

Although products may be prepared with mol ratios of formaldehyde to urea from about 2:1 to about 3:1; the preferred range is from 2.2 to 2.8 mols of formaldehyde per mol of urea. When lower ratios of formaldehyde to urea than 2.2:1 is employed, it is advisable to add water to the reaction mixture at the beginning, in order to obtain a syrup. With molar ratios of 3:1 there is no appreciable increase in viscosity for a period of approximately 16 hours, at a pH of approximately 2.5 or lower. The upper limit of pH which will be operable under the conditions of this invention will vary somewhat, depending on the mol ratio of formaldehyde to urea, as will the preferred pH. However, in no case, should the pH be above 4, and preferably not above 3.5, and for optimum results, the pH should be between 1 and 3, depending upon the mol ratio of urea and formaldehyde.

The resinous syrups prepared according to the teachings of this invention are particularly useful as adhesives, since they have an indefinite working life while heated, and form infusible, insoluble bonds upon cooling, which properties also adapt these resinous syrups for the particular utility of surface finishes and ornamental and decorative designs. The neutralized syrups can be readjusted in pH and temperature to provide cold-setting adhesives and surface finishes. As previously stated, the resinous syrups may be prepared in any desired viscosity and neutralized, and they may be dried, preferably by spray drying at temperatures preferably below 250° C., to provide a dry powder which is water-alcohol soluble, and from which solutions may be prepared by reacidification and heating to effect resinous syrups having desired properties as originally prepared. Other methods of drying may be used, such as tray drying at reduced pressure, but spray drying is preferred.

I claim:

1. A process comprising reacting an aqueous solution of formaldehyde and urea under alkaline conditions at a temperature between 70° C. and reflux for about 30 minutes, wherein the mol ratio is from about 2.2:1–2.8:1 respectively, adjusting the pH to 1–4 and reducing the temperature to a point between about 40–55° C. to effect a viscosity increase.

2. A process comprising reacting an aqueous solution of formaldehyde and urea under alkaline conditions at a temperature between 70° C. and reflux for about 30 minutes, wherein the mol ratio is from about 2.2:1–2.8:1 respectively, adjusting the pH to 1–3 and reducing the temperature to a point between about 40–55° C. to effect a viscosity increase.

3. A process comprising reacting an aqueous solution of formaldehyde and urea under alkaline conditions at a temperature between 70° C. and reflux for about 30 minutes, wherein the mol ratio is from about 2.2:1–2.8:1, respectively, adjusting the pH to 1–4 and reducing the temperature to a point between about 40–55° C. to effect a viscosity increase, and neutralizing the reaction mixture.

4. A process comprising reacting an aqueous solution of formaldehyde and urea under alkaline conditions at a temperature between 70° C. and reflux for about 30 minutes, wherein the mol ratio is from about 2.2:1–2.8:1, respectively, adjusting the pH to 1–4 and reducing the temperature to a point between about 40–55° C. to effect a viscosity increase, and neutralizing the reaction mixture and drying at a temperature below 250° C.

5. An adhesive comprising a urea-formaldehyde syrup obtained by reacting urea and an aqueous solution of formaldehyde in accordance with that process set forth in claim 1.

TZENG-JIUEQ SUEN.

REFERENCES CITED

The following references are of record in the file of this patent:

UNITED STATES PATENTS

| Number | Name | Date |
|---|---|---|
| 1,734,693 | Ripper | Nov. 5, 1929 |
| 2,245,491 | Menger et al. | June 10, 1941 |
| 2,312,210 | Dearing | Feb. 23, 1943 |